(12) United States Patent
Bledsoe

(10) Patent No.: US 11,554,710 B1
(45) Date of Patent: Jan. 17, 2023

(54) TRAVEL TRAILER GENERATOR MOUNTING SYSTEM

(71) Applicant: Sean Aaron Bledsoe, Thousand Oaks, CA (US)

(72) Inventor: Sean Aaron Bledsoe, Thousand Oaks, CA (US)

( * ) Notice: Subject to any disclaimer, the term of this patent is extended or adjusted under 35 U.S.C. 154(b) by 2 days.

(21) Appl. No.: 17/385,630

(22) Filed: Jul. 26, 2021

Related U.S. Application Data

(60) Provisional application No. 63/029,788, filed on May 26, 2020.

(51) Int. Cl.
| | |
|---|---|
| *B60P 3/36* | (2006.01) |
| *B62D 63/08* | (2006.01) |
| *B60R 9/06* | (2006.01) |
| *B60R 11/00* | (2006.01) |

(52) U.S. Cl.
CPC ............. *B60P 3/36* (2013.01); *B60R 9/06* (2013.01); *B62D 63/08* (2013.01); *B60R 2011/004* (2013.01); *B60R 2011/0042* (2013.01)

(58) Field of Classification Search
CPC .. B60R 9/00; B60R 9/06; B60R 11/00; B60R 2011/004; B60R 2011/042; B60P 3/36
See application file for complete search history.

(56) References Cited

U.S. PATENT DOCUMENTS

| | | | | |
|---|---|---|---|---|
| 4,103,960 A | * | 8/1978 | Ziese | ............... B60P 3/32 296/37.1 |
| 8,800,832 B2 | * | 8/2014 | Niemi | ............... B60P 3/36 224/401 |
| 11,084,412 B1 | * | 8/2021 | Shultz | ............... H02S 10/10 |

\* cited by examiner

*Primary Examiner* — Joseph D. Pape
(74) *Attorney, Agent, or Firm* — Plager Schack LLP; Mark H. Plager; Kara Verryt

(57) ABSTRACT

A travel trailer generator mounting system for enabling installation of a permanent onboard generator system onto a travel trailer may include a generator mount designed to engage with the travel trailer frame. The generator mount may include a top planar surface with a generator storage portion extending downward therefrom, the generator storage portion sized to accommodate mounting of a generator therein; a front lip extending substantially perpendicularly upwards from a front edge of the top planar surface; and a rear lip extending substantially perpendicularly upwards from a rear edge of the top planar surface. The front lip and the rear lip may be configured to engage with cross members on the travel trailer for mounting of the generator mount to the travel trailer.

5 Claims, 4 Drawing Sheets

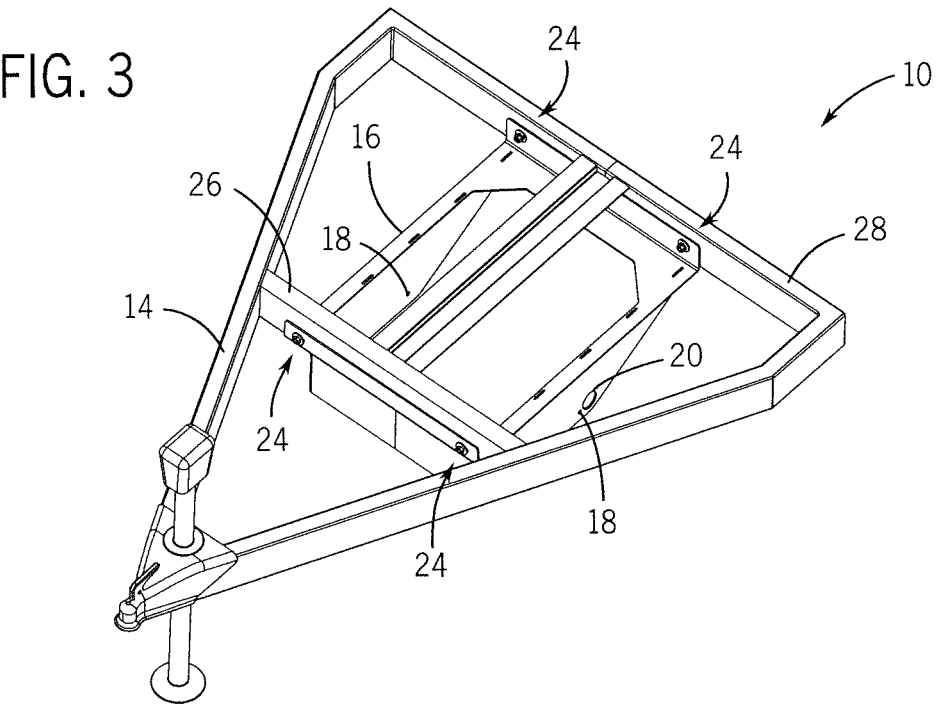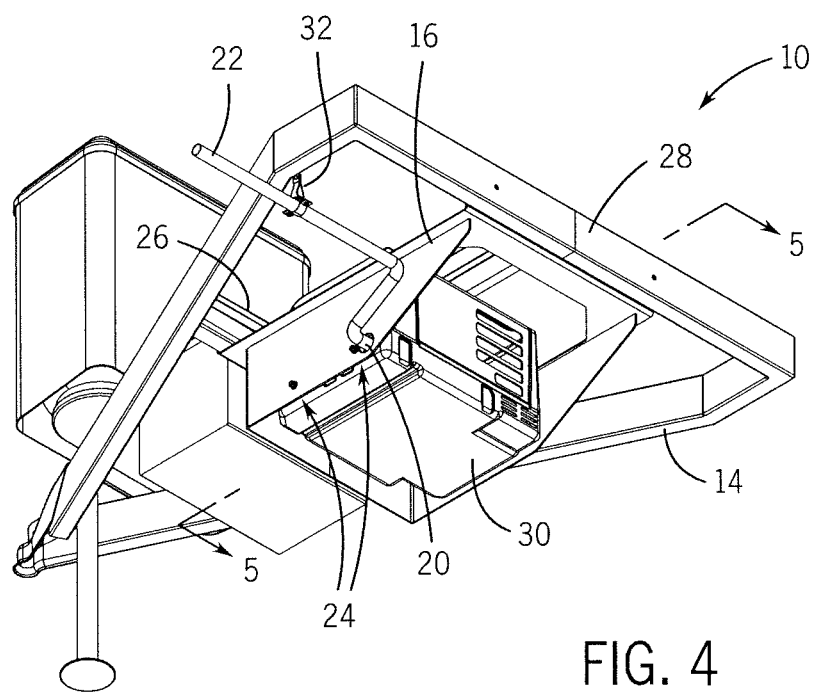

TRAVEL TRAILER GENERATOR MOUNTING SYSTEM

RELATED APPLICATION

This application claims priority to provisional patent application U.S. Ser. No. 63/029,788 filed on May 26, 2020, the entire contents of which is herein incorporated by reference.

BACKGROUND

The embodiments described herein relate generally to mounting systems and, more particularly, to a travel trailer generator mounting system.

AIRSTREAM travel trailers do not have a self-contained AC power generation system and require a physical connection to the terrestrial/utility power grid in order to operate major appliances and systems. The lack of such a system limits the amount of time and functionality of the recreation vehicle (RV) when using the vehicle in remove areas, which is typically referred to as "boon docking" or off grid camping.

Portable gasoline generators have become a standard piece of equipment used by AIRSTREAM travel trailer owners. These gasoline-powered generators must be transported to and from their destination and set up on site. A separate container of gasoline must also be transported as well. There is currently no standard way to transport these items.

Therefore, what is needed is a system that enables the installation of a permanent onboard generator system, particularly in AIRSTREAM travel trailers, wherein the system uses the existing fuel system built into the RV and, thus, does not require the user to transport fuel containers in their automobile. Moreover, what is requires is a system that requires minimal modification to the coach by utilizing existing mounting features, such as those provided for the original equipment manufacturer (OEM) spare tire carrier on a recessed belly area of the vehicle a-frame.

SUMMARY

Some embodiments of the present disclosure include a travel trailer generator mounting system for enabling installation of a permanent onboard generator system onto a travel trailer. The generator mounting system may include a generator mount designed to engage with the travel trailer frame. The generator mount may include a top planar surface with a generator storage portion extending downward therefrom, the generator storage portion sized to accommodate mounting of a generator therein; a front lip extending substantially perpendicularly upwards from a front edge of the top planar surface; and a rear lip extending substantially perpendicularly upwards from a rear edge of the top planar surface. The front lip and the rear lip may be configured to engage with cross members on the travel trailer for mounting of the generator mount to the travel trailer.

BRIEF DESCRIPTION OF THE FIGURES

The detailed description of some embodiments of the invention is made below with reference to the accompanying figures, wherein like numerals represent corresponding parts of the figures.

FIG. 3 is a top perspective view of one embodiment of the present disclosure.

FIG. 4 is a bottom perspective view of one embodiment of the present disclosure.

DETAILED DESCRIPTION

Figure 1:
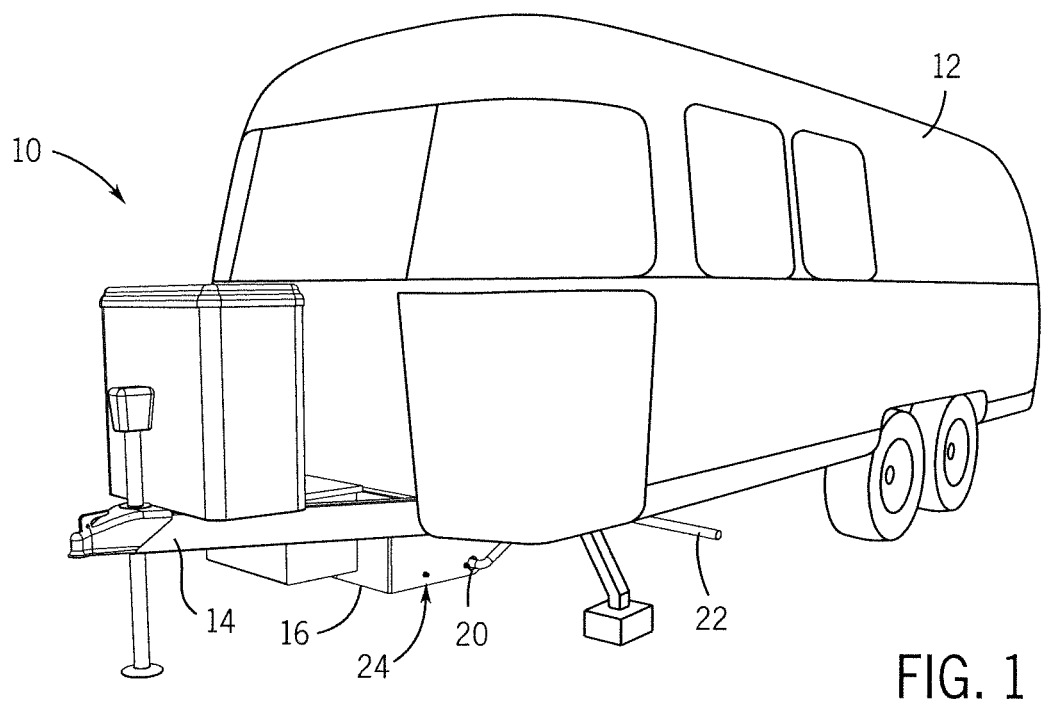
FIG. 1 is a perspective view of one embodiment of the present disclosure, shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a minimally invasive travel trailer generator mounting system and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements and the following examples are presented as illustrative examples only.

By way of example, and referring to FIGS. 1-6, some embodiments of the invention include a travel trailer generator mounting system 10 for enabling installation of a permanent onboard generator system, the generator mounting system 10 comprising a generator mount 16 designed to engage with a travel trailer frame 14, the generator mount 16 comprising a top planar surface 38 with a generator storage portion extending downward therefrom, the generator storage portion comprising a front wall 46 extending substantially perpendicularly downward from the top planar surface 38 and parallel to a front edge of the top planar surface 38; and a pair of sidewalls 44 extending substantially perpendicularly downwards from the top planar surface 38, a first sidewall of the pair of sidewalls 44 extending perpendicularly from a first edge of the front wall 46 toward a rear edge of the top planar surface 38 and a second sidewall of the pair of sidewalls 44 parallel to the first sidewall, the second sidewall extending perpendicularly from a second edge of the front wall 46, wherein each of the sidewalls comprise an angled rear edge attaching a bottom edge of the sidewalls to the rear edge of the top planar surface 38, wherein a storage area defined by space enclosed by the front wall 46 and the pair of sidewalls 44 is sized to accommodate a generator therein 30. The generator mount 16 may further comprise a front lip 40 extending substantially perpendicularly upwards from the front edge of the top planar surface 38 and a rear lip 42 extending substantially perpendicularly upwards from the rear edge of the top planar surface 38. As shown in the Figures, each of the front lip 40 and the rear lip 42 may comprise a plurality of mounting orifices 18 extending there through, wherein the mounting orifices 18 may each be positioned to align with fasteners 26 extending through a first cross member 26 of the travel trailer frame 14 and a second cross member 28 of the travel trailer frame 14, respectively.

For example, and as shown in FIG. 3, the front lip 40 may be positioned against a front surface of the first cross member 26 and the rear lip 42 may be positioned against a front surface of the second cross member 28, wherein fasteners 24 may be used to attach the front lip 40 and the rear lip 42 to the cross members 26, 28. Any suitable fasteners 24 may be used.

Figure 2:
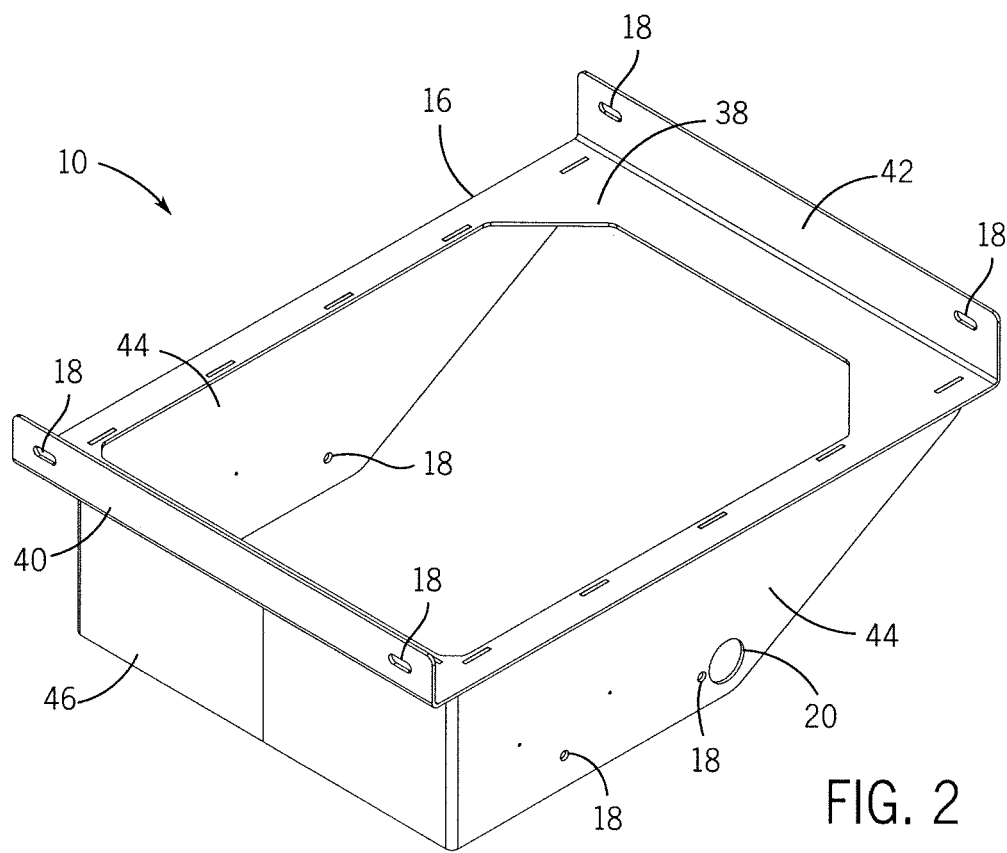
FIG. 2 is a top perspective view of one embodiment of the present disclosure.
Figure 5:
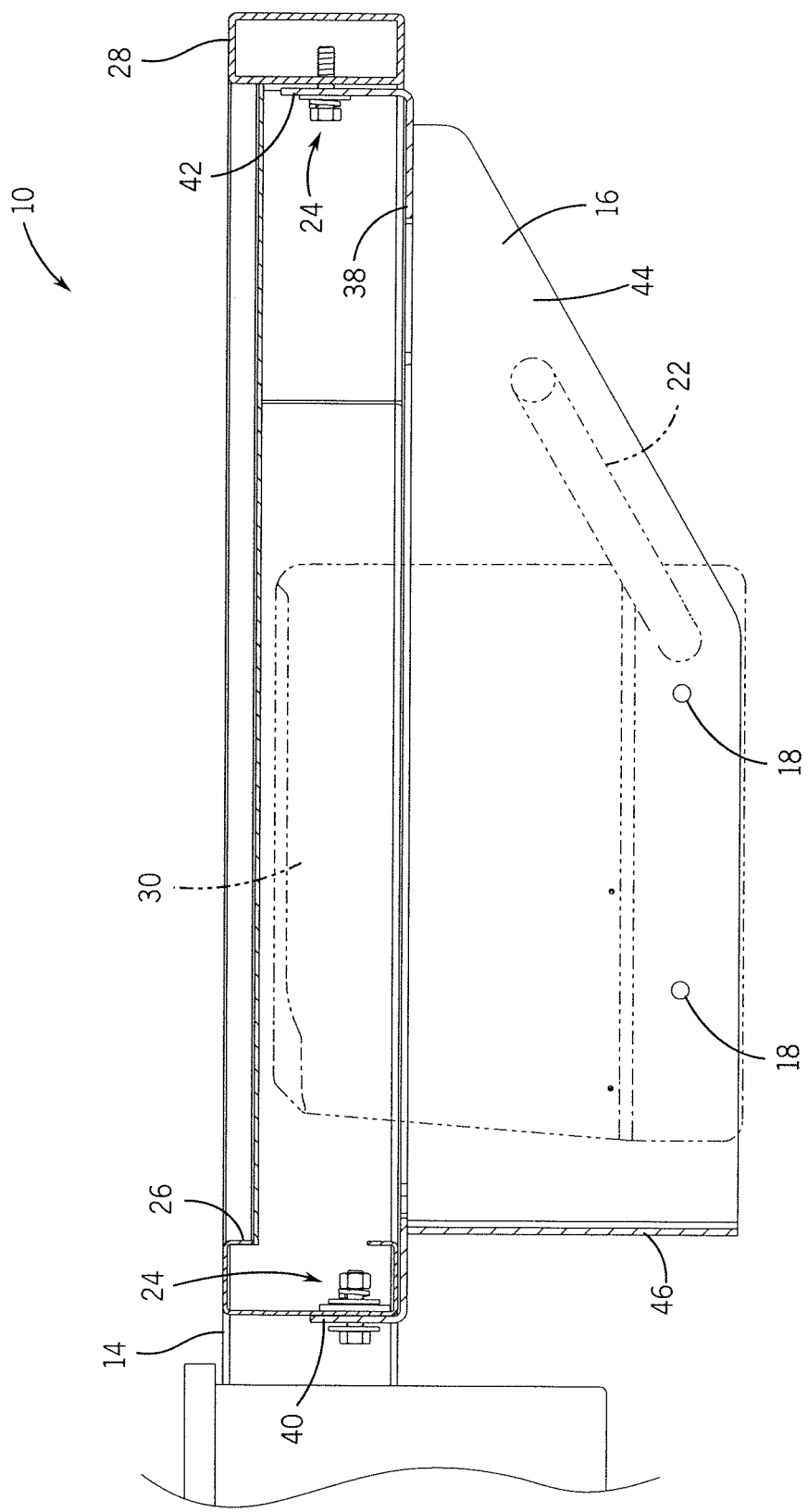
FIG. 5 is a detail section view of one embodiment of the present disclosure, taken along line 5-5 in FIG. 4.
Figure 6:
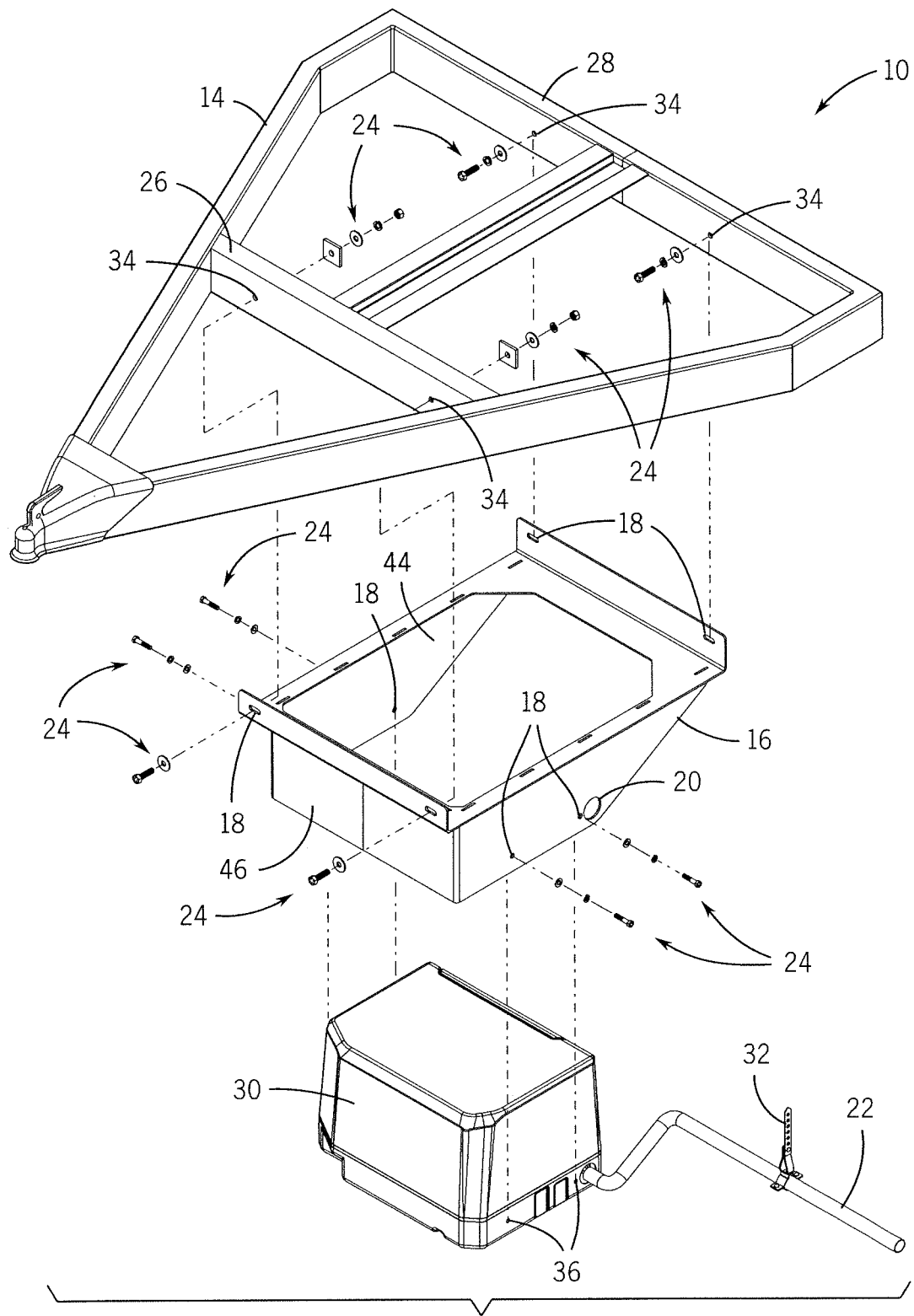
FIG. 6 is an exploded top perspective view of one embodiment of the present disclosure.

As shown in FIG. 2, each of the sidewalls 44 may comprise a plurality of mounting orifices 18 extending there through. The mounting orifices 18 may each be used in conjunction with a fastener 24 to secure the generator 30, and specifically generator mounting points 36, to the generator mount 16, as shown in FIG. 4. At least one of the pair of sidewalls 44 may further comprise an exhaust tube port 20 extending there through, wherein the exhaust tube port 20 is sized and positioned to allow for passage of an exhaust tube 22 extending from the generator 30 to pass there through when the generator 30 is mounted to the generator mount 16.

As explained above and as shown in the Figures, the generator mount 16 may attach to existing structural components on a travel trailer frame 14. More specifically, the generator mount 16 may be designed to engage to a portion of the travel trailer frame 14 between the travel trailer 12 and the trailer hitch. For example, specifically with respect to an AIRSTREAM travel trailer A-frame, the generator mount 16 may be attached to the A-frame by utilizing/repurposing the existing spare tire carrier mounting points 34. In such embodiments, use of the generator mount 16 may require removal of the spare tire carrier to install the generator mount 16 in the recessed area of the A-frame. Moreover, because of the structure of the generator mount 16, installation thereof may function to reinforce the cross members 26, 28 to which it is designed to attach. This may be accomplished by the front lip 40 creating a cradle to support the forward chassis cross member 26 to which it attaches, thus helping to distribute load across the beam and strengthening the frame 14 in that area in a symbiotic manner. Once installed, the generator mount 16 may form a structural tie between the fore and aft cross members 26, 28 and distribute the weight of the assembly out toward the main frame rails. A positive net effect of this connection is dramatically reduced subfloor flex and bounce inside the couch.

Installing the generator mount 16 of the present disclosure may form a mating interface between a specific recreation vehicle (RV) model 12 and a commercially available RV generator 30.

In some embodiments, the travel trailer generator mounting system 10 may be specifically designed for use with an AIRSTREAM travel trailer, as such trailers do not currently include any structure suitable for enabling the installation of an on-board generator. As such, the travel trailer generator mounting system 10 may be integrated into the existing AIRSTREAM travel trailer architecture, including the structural, electrical, and fuel storage/supply features. The integration may resolve health and safety concerns posed by transporting flammable fuel in a tow vehicle cabin, operating a standalone portable generator in poor/wet weather, and eliminate the need to physically move heavy equipment in and out of a vehicle upon arrival and departure.

The generator mount 16 of the present disclosure may be made from any desired material, such as metal cut into a pattern by laser, hydrogen, or manual cutting techniques. The cutout patterns may then be formed on a bending press and welded together at joining seams. Of course, any suitable manufacturing methods may be used. The device may be a standalone part with dimensions and fastening features determined by the target vehicle and generator (the appliance that the generator mount carries).

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A travel trailer generator mounting system for enabling installation of a permanent onboard generator system onto a travel trailer, the generator mounting system comprising:
   a generator mount designed to engage with the travel trailer, the generator mount comprising:
      a top planar surface with a generator storage portion extending downward therefrom, the generator storage portion sized to accommodate mounting of a generator therein;
      a front lip extending substantially perpendicularly upwards from a front edge of the top planar surface; and
      a rear lip extending substantially perpendicularly upwards from a rear edge of the top planar surface,
   wherein:
      the front lip is configured to engage with a first cross member on the travel trailer; and
      the rear lip is configured to engage with a second cross member on the travel trailer.

2. The generator mounting system of claim 1, wherein the generator storage portion comprises:
   a front wall extending substantially perpendicularly downward from the top planar surface and parallel to a front edge of the top planar surface; and
   a pair of sidewalls extending substantially perpendicularly downwards from the top planar surface,
   wherein:
      a first sidewall of the pair of sidewalls extends substantially perpendicularly from a first edge of the front wall toward a rear edge of the top planar surface;
      a second sidewall of the pair of sidewalls is parallel to the first sidewall, the second sidewall extending substantially perpendicularly downward from a second edge of the front wall;
      the first sidewall and the second sidewall each comprise an angled rear edge attaching a bottom edge of each of the respective sidewalls to the rear edge of the top planar surface; and
      a storage area is defined by space enclosed by the front wall and the pair of sidewalls, the storage area being sized to accommodate the generator therein.

3. The generator mounting system of claim 2, wherein:
   each of the first sidewall and the second side wall comprise a plurality of mounting orifices extending there through; and
   the plurality of mounting orifices are positioned to align with mounting points on the generator.

4. The generator mounting system of claim 2, at least one sidewall of the pair of sidewalls further comprises an exhaust tube port extending there through, wherein the exhaust tube port is sized and positioned to allow for passage of an exhaust tube extending from the generator to pass there through when the generator is mounted to the generator mount.

5. The generator mounting system of claim 1, wherein:
each of the front lip and the rear lip comprise a plurality of mounting orifices extending there through; and
the plurality of mounting orifices are positioned to align with mounting points on the first cross member and the second cross member, respectively.

\* \* \* \* \*